(12) United States Patent
Smith et al.

(10) Patent No.: US 9,285,884 B2
(45) Date of Patent: Mar. 15, 2016

(54) GESTURE BASED CONTROL APPLICATION FOR DATA SHARING

(71) Applicant: AMX LLC, Richardson, TX (US)

(72) Inventors: George Carl Smith, Euless, TX (US); Rashid Skaf, Plano, TX (US); Darin William Smith, Plano, TX (US)

(73) Assignee: AMX LLC, Richardson, TX (US)

( * ) Notice: Subject to any disclaimer, the term of this patent is extended or adjusted under 35 U.S.C. 154(b) by 0 days.

(21) Appl. No.: 13/888,538

(22) Filed: May 7, 2013

(65) Prior Publication Data

US 2013/0335316 A1    Dec. 19, 2013

Related U.S. Application Data

(60) Provisional application No. 61/659,158, filed on Jun. 13, 2012.

(51) Int. Cl.
*G06F 3/01* (2006.01)
*G06F 17/30* (2006.01)
*G06F 3/0488* (2013.01)

(52) U.S. Cl.
CPC ............ *G06F 3/017* (2013.01); *G06F 3/04883* (2013.01); *G06F 17/30* (2013.01)

(58) Field of Classification Search
CPC .......... G06F 3/017; G06F 2203/04108; G06F 2203/04808
USPC .................................... 345/173; 715/863, 848
See application file for complete search history.

(56) References Cited

U.S. PATENT DOCUMENTS

| | | | |
|---|---|---|---|
| 2010/0257251 A1* | 10/2010 | Mooring et al. ............... | 709/216 |
| 2010/0287513 A1* | 11/2010 | Singh et al. .................... | 715/863 |
| 2012/0192086 A1* | 7/2012 | Ghods .................... | G06Q 10/10 715/753 |
| 2013/0031208 A1* | 1/2013 | Linton et al. .................. | 709/217 |

* cited by examiner

*Primary Examiner* — Kevin M Nguyen

(57) ABSTRACT

Receiving user gesture input commands and interpreting the commands to conduct presentation level control system processing and related presentation communications includes, in one example, detecting an input gesture command via a controller and processing the input gesture command via a processor. The example may also include retrieving at least one data file object responsive to the processed input gesture command, and transmitting the at least one media object to a remote device.

17 Claims, 6 Drawing Sheets

FLICK EXAMPLE

FLICK EXAMPLE

FIG. 1

SHARING MEDIA
EXAMPLE

FIG. 2

SWITCH A/V
EXAMPLE

GESTURE BASED CONTROL APPLICATION FOR DATA SHARING

CROSS-REFERENCE TO RELATED APPLICATION

This application claims priority to provisional application No. 61/659,158 entitled GESTURE BASED CONTROL filed on Jun. 13, 2012 the entire contents of which are incorporated herein by reference.

TECHNICAL FIELD OF THE APPLICATION

This application relates to a method and apparatus of providing user input gesture commands and processing and conducting control system outputs related to the user input gesture commands.

BACKGROUND OF THE INVENTION

Conventionally, long, repetitive and unintuitive sequences of button presses (i.e., keystrokes) for managing data file sharing and corresponding audio and/or video (A/V) systems have proven to be cumbersome and unnecessary.

The inspiration for quickly navigating menu items and options has arisen from movies and other instances of futuristic menu selections. For example, 'flicking' menu items around may be performed by a computer control system interface session conducted between a human and a computerized menu. The use of such technology may increase communication and sharing during corporate meetings and in conference rooms as well as educational events and lectures. Other uses such as home use are also possible.

SUMMARY OF THE APPLICATION

One example embodiment may provide a method that includes detecting an input gesture command via a controller, processing the input gesture command via a processor, retrieving at least one data file object responsive to the processed input gesture command, and transmitting the at least one media object to a remote device.

Another example embodiment may provide an apparatus including a controller configured to detect an input gesture command and a processor configured to process the input gesture command, retrieve at least one data file object responsive to the processed input gesture command, and a transmitter configured to transmit the at least one media object to a remote device.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, gesture signaling identified and received at a control system may alleviate communicating complex strings (e.g., names, passwords, security codes, etc.) between devices for purposes of session control and resource location, while minimizing human effort and frustration.

In general, gesture detection regardless of the underlying technology (e.g., touch surface, free-space detection, etc.) may be used to perform control inputs to a control system that enhance the intuitiveness of the control system. Gestures provide a way for human interaction with a control system that when properly deployed may enable a natural interactive experience for the user.

Example realizations of gesture-based interactions according to example embodiments may include intuitive movement of multimedia content (e.g., photo, video, audio, applications, or application data) between presentation devices, such as in a conference room including but not limited to video screens, mobile devices, remote displays attached to computing devices, teleconferencing systems, etc. Additional gesture-based applications may provide for intuitive control of audio and video switching, and collaborative sharing of multimedia content between devices.

Example components used for integrating gestures as a control input may include a device capable of detecting a gesture and communicating that event to a master controller, such as a computer or computer chip. Communications may be conducted over either a wired or wireless communication media and may include one or more communication media types for communicating messages between involved devices, such as, for example, any number of wired or wireless computer networks, serial transceivers, etc.

Other examples of network devices which may permit gesture based interpretation and processing may include a master controller or computer configured to run or execute a program code and communicate with other devices via any mutual communications medium. One or more devices may be used to present the desired action. These may include but are not limited to computer displays, mobile devices, A/V switchers, streaming media players or recorders.

According to example embodiments, there are options in the user interface on a source device of the gesture control system to select and determine the items to be flicked and a gesture recognition procedure to detect a "flick" input movement indicating that the selected items should be sent to the destination device. Additional options may include determining and transmitting the intended control action to the destination device, and loading and viewing and/or playing the selected content on the destination device.

Figure 1:
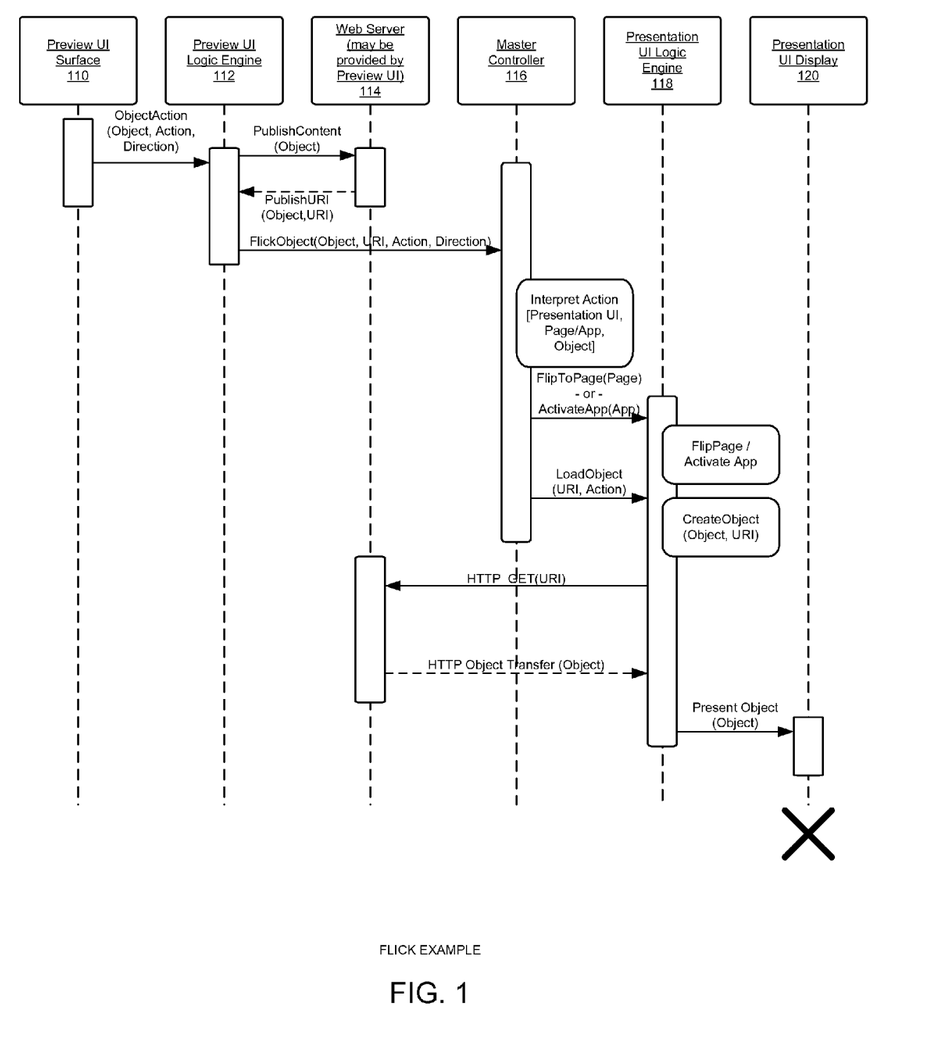
FIG. 1 illustrates an example communication signaling diagram of an example flick operation, according to example embodiments of the present invention.

FIG. 1 illustrates an example flick operation of the gesture control system according to example embodiments of the present invention. Referring to FIG. 1, in order to share a photograph from a USB data storage device (i.e., thumb drive), an example message flow may be based on a control system that includes a device operating a preview application and one or more devices with presentation applications.

In operation, a conference room may include a touch panel device at the head of the table and touch panels along the left and right hand sides of the table. All of the touch panels are connected to a master controller 116. The user sitting at the head of the table may have plugged a USB drive containing photographs into the preview user interface panel 110. The preview UI logic engine 112 permits the user to select photographs which are then published to a web server 114. The web server can reside on the preview touch panel itself or be hosted elsewhere in the system. The user may select one or more photographs to 'flick' and performs the flick gesture on the touch panel's control surface. A 'FlickObject' message is transmitted to the master controller 116 including such information as the URI of the photograph on the web server 114 and the direction of the flick gesture (e.g., right, left, up, down, etc.). The master controller 116 interprets this message and determines that the user flicked a photograph of an embarrassing incident at the last corporate BBQ to the right. There may be one touch panel on the right hand side of the table corresponding to the diagram in FIG. 1 as the presentation UI display 120 controlled by a presentation UI logic 118. The master controller 116 transmits messages to this touch panel to activate a photo viewer application and load the photo from the specified uniform resource identifier (URI). The touch panel performs these operations and presents the flicked photograph to its viewers via a main display or an array of displays.

The master controller 116 can optionally transmit a message to the source panel instructing it to remove the selected photograph from its display. This procedure completes the effect of the user having "flicked" an item from one location to another. In general, "flick" gestures may be referred to as "throw" gestures indicating that they are fast directional motions as if you are throwing something. The application of graphics effects may enable the operation(s) to appear even more aesthetically visually. The originating photograph can be rapidly moved off of the screen on the source panel (i.e., instructor device) and then moved onto the screen of the destination panel (i.e., recipient device). The preview and presentation applications can be native to the actual devices or can be HTML based applications hosted by servers.

The object may be identified as an image preview or data file object that is selected via the gesture movement to be flicked with a hand gesture or motion movement to one or more recipient devices. The gesture may be identified as having a corresponding magnitude or intensity level. For example, a full handed (i.e., four finger) or fast flick may forward a data object to all potential recipients, such as an entire classroom or conference room. In an alternative, a short, single finger and/or slow flick may be intended for fewer or only one recipient. The flick gesture may be used to initiate a publish content object to a web server that is accessible to all users of the content sharing system. Once the file publishing is initiated, a corresponding URI link may be sent to all intended recipients including the initiator.

Also, the flick operation may invoke various different data parameters, such as the data object or file, a URI to identify the data object, an action (share, copy, delete, remove, etc.), and a direction. The master controller 116 is responsible for interpreting the data and interpreting the action to be performed. An application may be initiated or the page used to share the content may be opened and/or shared with all intended recipients. The presentation logic may communicate with the web server to transfer the data object via a HTTP GET command or other data object transfer.

Figure 2:
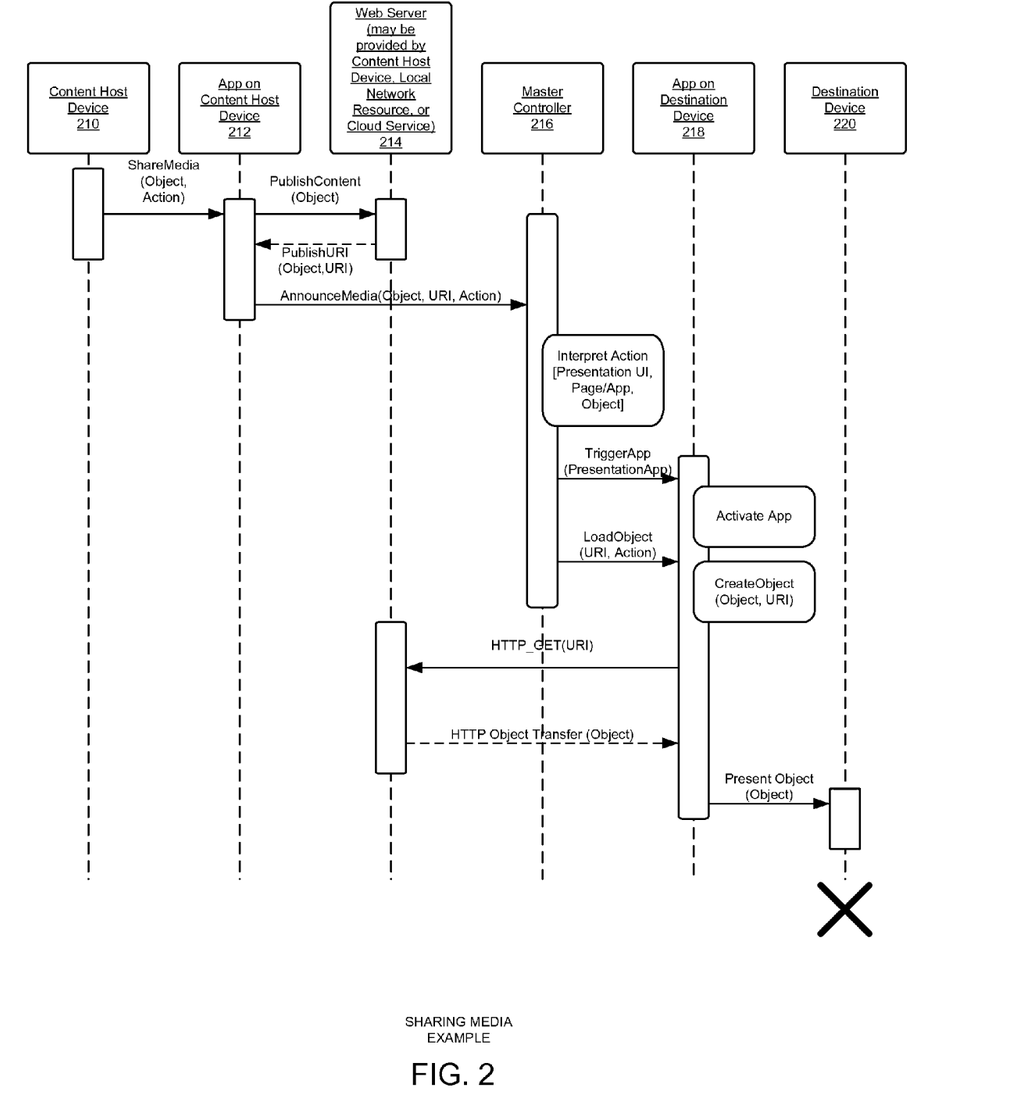
FIG. 2 illustrates an example communication signaling diagram of an example sharing media operation, according to example embodiments of the present invention.

FIG. 2 illustrates another example signaling diagram directed to a sharing media example. Like commands and references refer to like elements and operations. Referring to FIG. 2, a professor may share a media object with various students' computing device (i.e., smartphones, tablets, laptops, etc.). The message flow in FIG. 2 may be a professor lecturing in a classroom that has a media object he/she desires to send to the smartphones of students participating in the lecture, or computing tablets or laptops or other processing devices. There may be a touchpanel on the content host device 210 connected to a master controller 216 and a web server 214.

In operation, at the beginning of class, the students "registered" their devices with the classroom control application running on the master controller 216. The registration process can be accomplished in different ways. A dedicated application can be downloaded into the smartphone devices or it can be an HTML only configuration. The registration mechanism lets the master controller 216 identify which devices are in the audience and prepares the devices themselves to receive media objects and control messages.

One variation is to configure the student devices with the use of a QR code projected on the screen at the beginning of class. The students may scan the QR code and receive the application information needed to receive data files and other object sharing. The professor may have selected the media object and the selection application on the source device which has published it to the web server 214. The professor then performs a flick to the top of the control panel, basically flicking towards the audience. This operation transmits an 'AnnounceMedia' message to the master controller 216 which interprets the intended action. The master controller 216 then transmits a 'TriggerApp' message and 'LoadObject' message to all registered devices in the classroom. This will activate the appropriate viewer application 218 on each device and cause each device to download the media object from the web server. One variation is for the application on the destination device 218 to download and store the media object for viewing at a later time. Another variation would be for the device application 218 to allow flicks of objects back to the professor or even to the presentation screen.

Another variation would permit annotations that the professor is performing at the touch panel to appear on students' smartphone or related devices as well as the large projection screen. That is, 'flick' updates may be performed seamlessly to the application ready devices. The flick operation need not be limited to transmission to a physical device. In a properly configured system the media object could be sent to email, a cloud drive, etc.

According to example embodiments, a pairing operation may be performed to pair the user gestures with actual control system output (i.e., audio and video manipulation, etc). On the UI device, for specific actions, the UI may be pre-programmed with a set of actions to trigger based on particular gestures (e.g., flick up, flick right, etc.) for specific objects, such as a preview window. An automated action sequence may occur either through customization files that include pre-programmed commands to execute and specific times or via a specialized application.

On the master controller, the UI device could send a message to the master controller including an object ID (i.e, which entity was acted on within the UI), a URI to locate the content, and a type of gesture (flick up, flick right, etc.). Then, the program operating on the master controller can use a data store on the master controller to decide what to do and how to present the URI. The UI entity and gesture types would be a pair that would be looked up. The program would then utilize the URI provided and the output of the lookup to decide what action to perform. In another example, the control system may include the capability to trigger events both in terms of being able to show symbols on a panel as well as the panel being able to read symbols from the smart device through the integrated camera.

Figure 3:
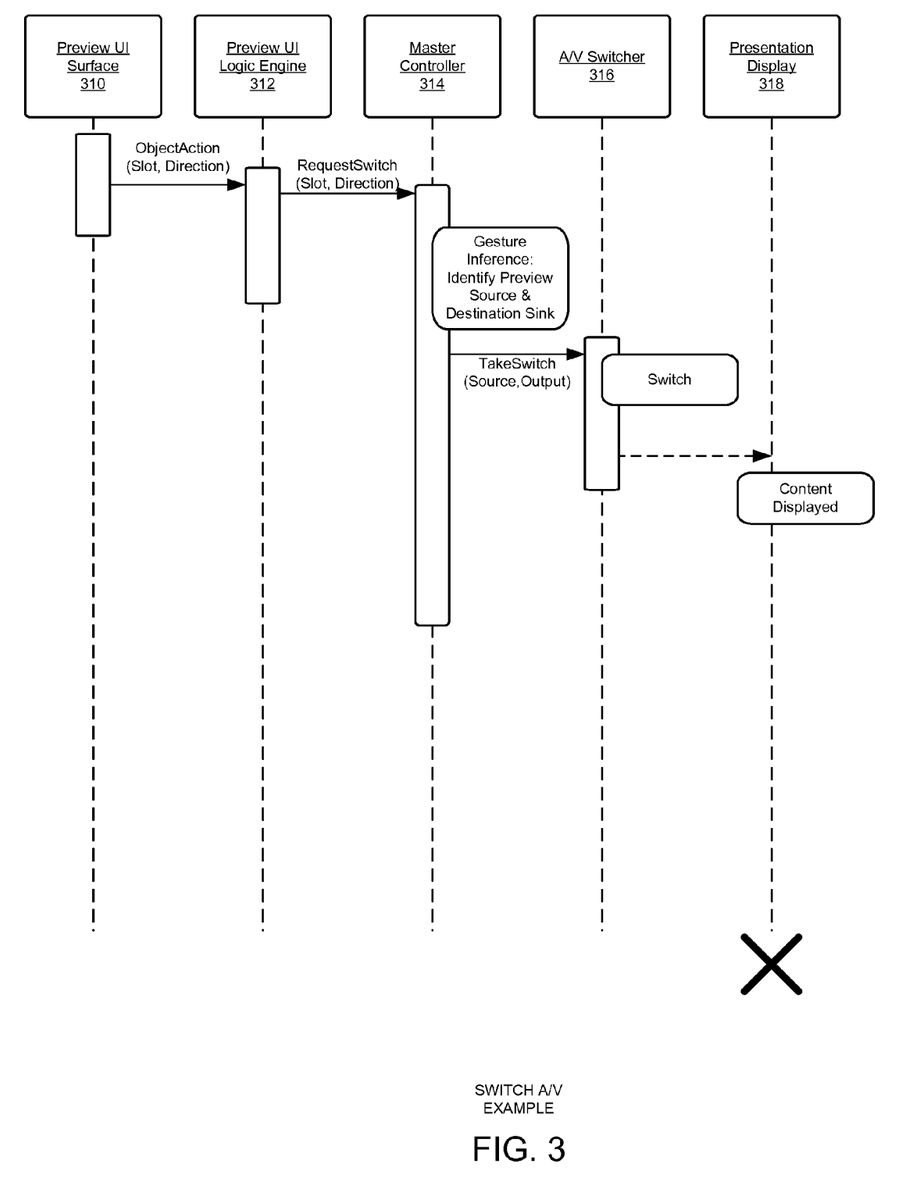
FIG. 3 illustrates an example communication signaling diagram of an example switching A/V media operation, according to example embodiments of the present invention.

FIG. 3 illustrates another example communication signaling diagram of an example audio/video switching operation controlled by a flicking operation. Referring to FIG. 3, a flick operation may control an A/V switcher device in an example system where a preview UI device 310 is connected to a master controller 314 with an A/V switcher 316 and a large presentation display 318. The preview device 310 in this example is a touch panel which has a series of subpages laid out horizontally on the screen. Each subpage illustrates the preview of a video slot input on the switching device 316. The user can use scroll operations to move around the video previews and see exactly what is on each input slot.

In operation, the user may select a slot window and 'flick' it in an upwards direction. The preview UI logic engine 312 transmits a 'RequestSwitch' message to the master controller 314. The application code in the master controller 314 interprets the contents of this message and determines the preview source and destination sink of the user gesture. A 'TakeSwitch' message is issued to the A/V switcher indicating the desired source slot. The switcher responds with a switch operation and content now appears on the presentation display 318.

Other example operations may include flicking multiple items, for example, the simplest implementation may allow the user to flick a single media object. The preview UI logic engine should also support multiple selections which are then sent as a group with a single flick gesture. Accordingly, the presentation UI logic engine should be able to receive, download and manage multiple objects.

Shared objects may include permanent or temporary sharing restrictions. In one example, a corporate meeting will need to share a PDF file that should not leave the room after the meeting. The preview UI logic engine should be configured in such a way that the user can control this policy. Accordingly, the presentation application should enforce this policy and the policy parameters must be included in the message traffic.

In another example, copying may be performed by a flick effect that is configured as a "move" operation or a "copy" operation by default. One possible way to override a move and make it a copy would be to use two fingers. The first finger could "hold" the originals in place and the second finger could flick the "copies". Essentially, the flick operation in this example may include two or more flick operations with one conditional on the other to identify an object to share and then initiating a share operation. Regarding 'flick' directions, the touch panels can detect flicks in multiple directions including left, right, up, down, near or far, the four corners and even other gestures such as circles. The system design and configuration allows for each gesture direction to represent a unique destination or control operation for object sharing. One variation in the user interface design is to place destination graphics on the preview UI to clearly indicate where each flick is going.

In another example, use of accelerometers on source devices may provide an application on a smartphone or tablet or similar computing device that permits selection of source media and uses actual device motions to perform the 'flick' as opposed to the touch screen surface. That is, instead of selecting an object and flicking it across the touch screen surface, a user may select an object and then flick the entire device similar to a Nintendo Wii® controller. In this example, the instructor may be utilizing a smartphone with an accelerometer that detects a movement flick to initiate a file sharing operation. In one example, the instructor may perform a short flick in one direction to share a data object with one user in that direction or whose device is registered as being in that position. Additionally, the instructor may perform a fast or wide movement "flick" by quickly, aiming in an upward direction, etc., which will then share the data object with all members of the group. The movements may be detected by the accelerometer as having a particular direction, magnitude, shape, etc.

In yet further examples, worldwide sharing may be performed by flicking operations which occur across physical sites worldwide according to the examples included herein. Such a procedure may be performed by coordinating message traffic, master controller communications, web servers and media streams across the various locations and networks. Media transfer protocols may not necessarily require the media transfers to be limited to HTTP protocols. Other protocols can be used such as FTP, etc. In this example, the initiator may select a different server to share a data object, one server may be selected during the flick to share with a first group of users. The other server may be for a different group of users (i.e., public vs. private).

Figure 4:
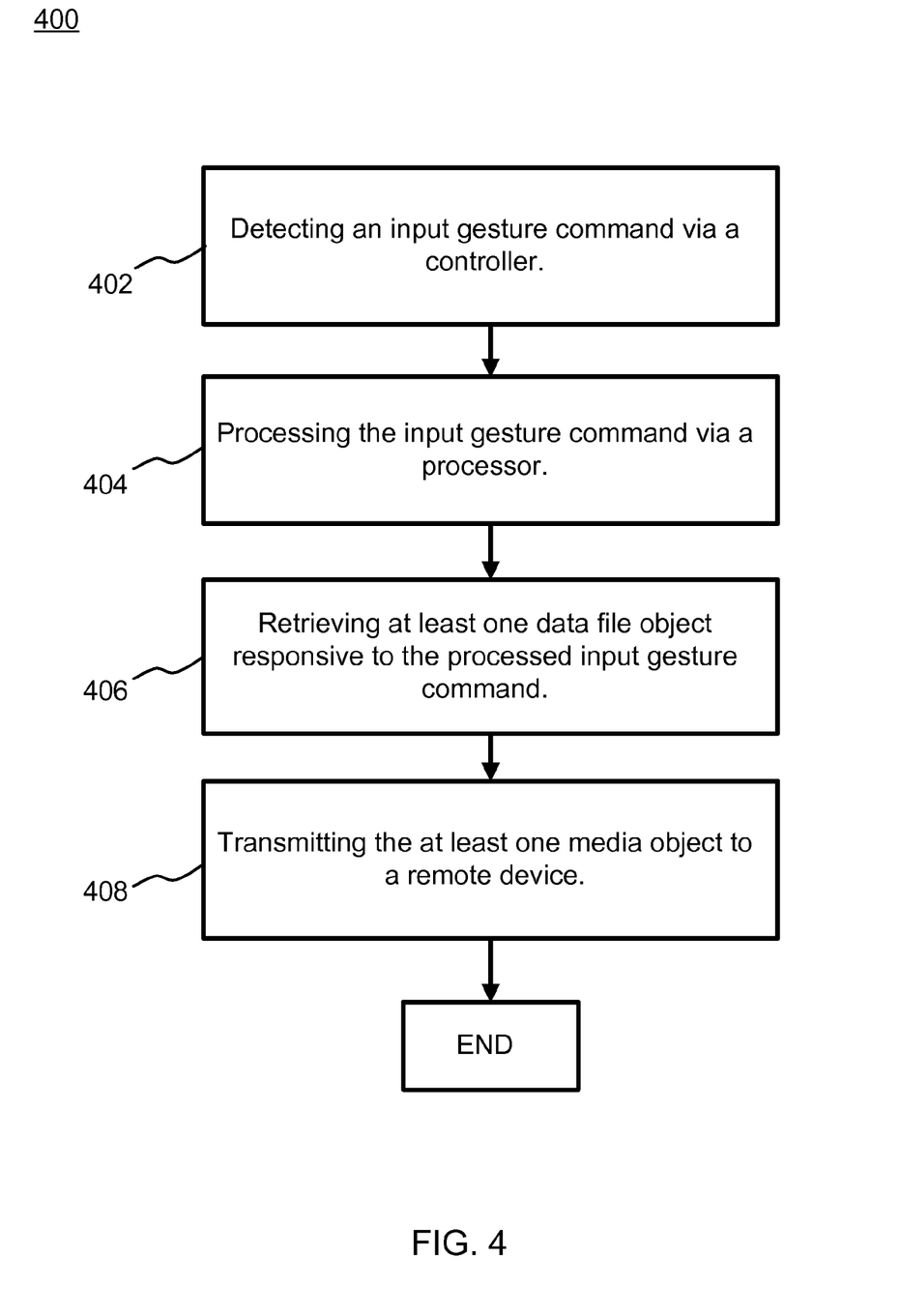
FIG. 4 illustrates a flow diagram of an example method according to an example embodiment of the present application.

FIG. 4 illustrates an example method of operation according to example embodiments. Referring to FIG. 4, the method may provide detecting an input gesture command via a controller at operation 402 and processing the input gesture command via a processor at operation 404. The method may also include retrieving a data file object responsive to the processed input gesture command at operation 406, and transmitting the data object to a remote device 408. The data object may a data file that is shared with a number of recipient devices.

Figure 5:
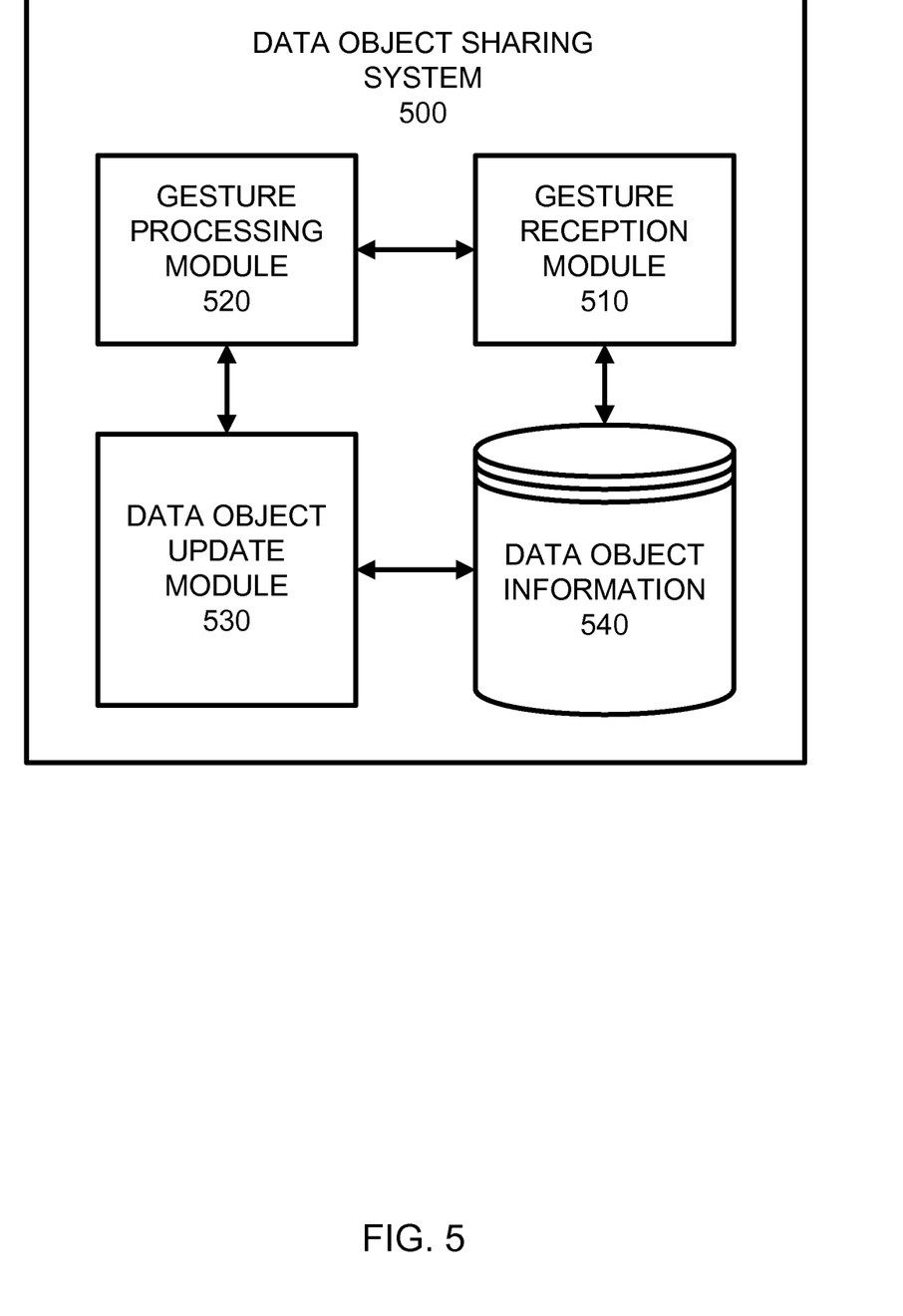
FIG. 5 illustrates a system configuration that is configured to perform one or more operations corresponding to the example embodiments.

FIG. 5 illustrates an example data object file sharing system 500 according to example embodiments. Referring to FIG. 5, the gesture reception module 510 may be configured to detect the gesture input as a known command stored in the database 540 based on the direction, movement, etc. The gesture processing module 520 may be configured to process the input gesture command via a processor and retrieve at least one data file object responsive to the processed input gesture command stored in the database 540. The system may also be configured to transmit the at least one media object to a remote device via the update module 530.

The system 500 may also be configured to detect a particular direction associated with the gesture movement via the processing module 520 and transmit the one or more data file objects to a remote device(s) that is positioned in the particular direction associated with the gesture movement. The process may also include identifying the input gesture via a movement performed on an electronic device detected via an accelerometer, retrieving the at least one data file object from memory, forwarding the at least one data file to a network server, and transmitting an access link to a plurality of user devices linked to the network server The method may also provide identifying the input gesture as a flick operation which controls an audio/video (A/V) switch to activate and generate a content preview on an AV presentation display. The at least one data file object may be a media object that includes at least one of a video file and a photo image file. Also, the plurality of user devices may be registered with an application operating with the controller. In another example, the system 500 may provide creating an object identifier associated with the at least one data file object, a uniform resource identifier (URI) that identifies an online data file storage location of the at least one data file object, and a direction of the gesture indicating an object included on a user interface associated with the controller responsive to gesture input command.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 102 and 103, etc.

Figure 6:
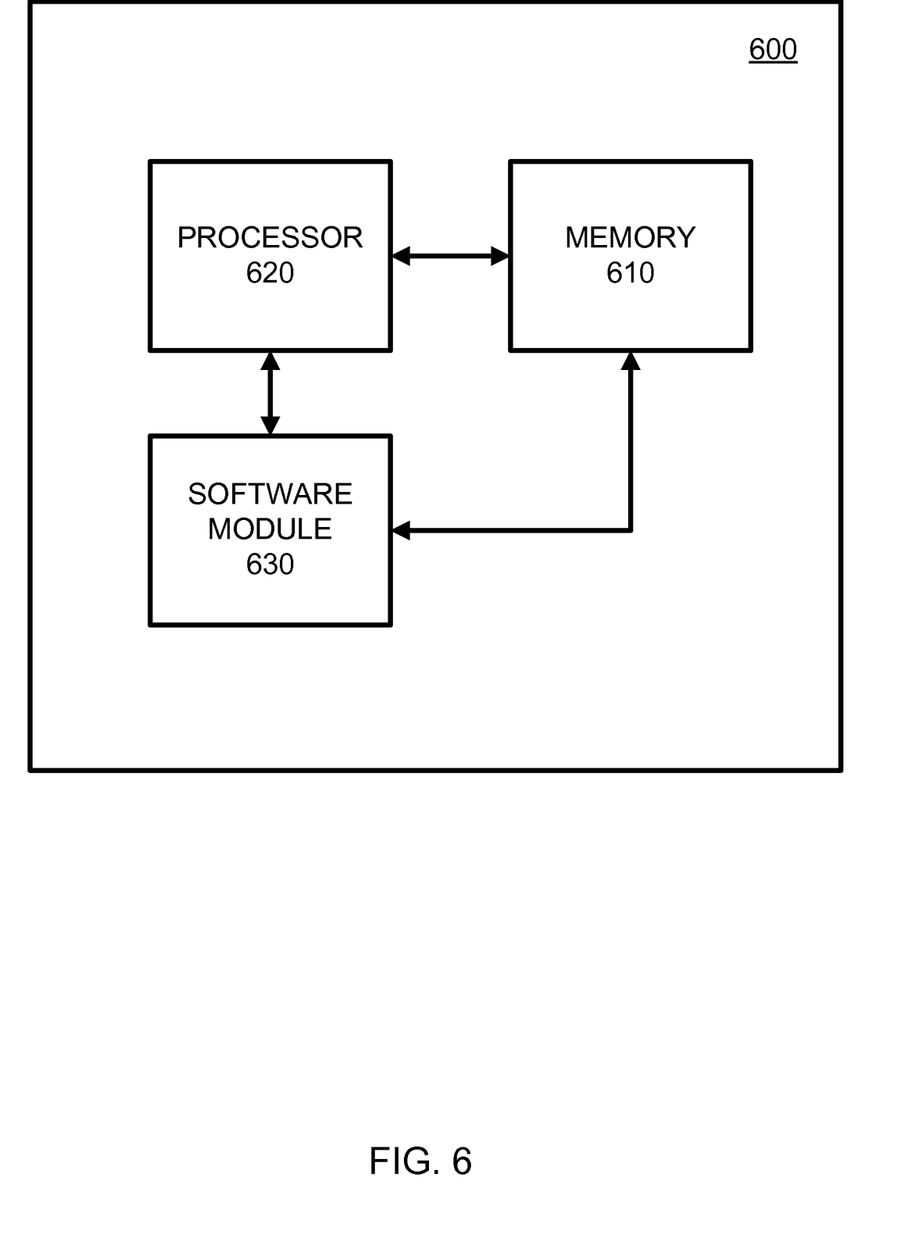
FIG. 6 illustrates an example network entity device configured to store instructions, software, and corresponding hardware for executing the same, according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 5 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   displaying a registration code on a display within a room containing a control panel device;
   establishing a plurality of registered devices with a master controller using the displayed registration code;
   detecting all input gesture command via the control panel device;
   processing the input gesture command via a processor to determine that at least one data file object is to be shared with the plurality of registered devices;
   transmitting a message to the master controller that indicates the at least one data file object that is to be shared to the plurality of registered devices;
   transmitting at least one message from the master controller to the plurality of registered devices that triggers the plurality of registered devices to open an application on a respective registered device and send a download request from the application to a server to download the at least one data file object; and
   transmitting the at least one data file object from the serve to the respective registered device in response to receiving the download request from the respective registered device.

2. The method of claim 1, further comprising:
   identifying an input gesture associated with the input gesture command via a movement performed on an electronic device detected via an accelerometer.

3. The method of claim 1, further comprising:
   retrieving the at least one data file object from memory;
   forwarding the at least one data file to a network server;
   transmitting an access link to a plurality of user devices linked to the network server; and
   identifying the input gesture as a flick operation which controls an audio/video (A/V) switch to activate and generate a content preview on an AV presentation display.

4. The method of claim 1, wherein the at least one data file object is a media object comprising at least one of a video file and a photo image file.

5. The method of claim 3, wherein the plurality of user devices are registered with an application operating with the control panel device.

6. The method of claim 1, further comprising:
   creating an object identifier associated with the at least one data file object, a uniform resource identifier (URI) that identifies an online data file storage location of the at least one data file object, and a direction of the gesture indicating an object included on a user interface associated with the control panel device responsive to gesture input command.

7. An apparatus, comprising:
   a display device configured to display a registration code in a room;
   a control panel device in the room, the control panel device configured to establish a plurality of registered devices with a master controller using the displayed registration code, the control panel device configured to detect an input gesture command;
   a processor configured to:
     process the input gesture command to determine that at least one data file object is to be shared with a plurality of registered devices; and
     transmit a message to the master controller that indicates the at least one data file object that is to be shared to the plurality of registered devices;
   the master controller configured to transmit at least one message from the master controller
   to the plurality of registered devices that triggers the plurality of registered devices to open an application on a respective registered device and send a download request from the application to download the at least one data file object; and
   a server configured to transmit the at least one data file object to the respective registered device in response to receiving the download request.

8. The apparatus of claim 7, wherein the processor is further configured to identify an input gesture associated with the input gesture command via a movement performed on an electronic device detected via an accelerometer.

9. The apparatus of claim 7, wherein the processor is further configured to retrieve the at least one data file object from memory and wherein the transmitter is further configured to transmit the at least one data file to a network server and are access link to a plurality of user devices linked to the network server, and idem the input gesture as a flick operation which controls an audio/video (A/V) switch to activate and generate a content preview on an AV presentation display.

10. The apparatus of claim 7, wherein the at least one data file object is a media object comprising at least one of a video file and a photo image file.

11. The apparatus of claim 9, wherein the plurality of user devices are registered with an application operating with the control panel device.

12. The apparatus of claim 7, wherein the processor is further configured to create an object identifier associated with the at least one data file object, a uniform resource identifier (URI) that identifies an online data file storage location of the at least one data file object, and a direction of the gesture indicating an object included on a user interface associated with the controller responsive to gesture input command.

13. A non-transitory computer readable storage medium configured to store instructions that when executed cause a processor to perform:
displaying a registration code on a display within a room containing a control panel device;
establishing a plurality of registered devices with a master controller using the displayed registration code;
detecting an input gesture command via the control panel device;
processing the input gesture command via a processor to determine that at least one data file object is to be shared with the plurality of registered devices;
transmitting a message to the master controller that indicates the at least one data file object that is to be shared to the plurality of registered devices;
transmitting at least one message from the master controller to the plurality of registered devices that triggers the plurality of registered devices to open an application on a respective registered device and send a download request from the application to a server to download the at least one data file object.

14. The non-transitory computer readable storage medium of claim 13, wherein the processor is further configured to perform:
identifying an input gesture associated with the input gesture command via a movement performed on an electronic device detected via an accelerometer.

15. The non-transitory computer readable storage medium of claim 13, wherein the processor is further configured to perform:
retrieving the at least one data file object from memory and;
forwarding the at least one data file to a network server;
transmitting an access link to a plurality of user devices linked to the network server; and
identifying the input gesture as a flick operation which controls an audio/video (A/V) switch to activate and generate a content preview on an AV presentation display.

16. The non-transitory computer readable storage medium of claim 13, wherein the at least one data file object is a media object comprising at least one of a video file and a photo image file.

17. The non-transitory computer readable storage medium of claim 16, wherein the plurality of user devices are registered with an application operating with the control panel device and wherein the processor is further configured to create an object identifier associated with the at least one data file object, a uniform resource identifier (URI) that identifies an online data file storage location of the at least one data file object, and a direction of the gesture indicating an object included on a user interface associated with the controller responsive to gesture input command.

* * * * *